UNITED STATES PATENT OFFICE.

GUSTAV A. HAGEMANN, OF COPENHAGEN, DENMARK.

IMPROVEMENT IN MORDANTS FOR DYEING.

Specification forming part of Letters Patent No. 143,449, dated October 7, 1873; application filed June 21, 1873.

*To all whom it may concern:*

Be it known that I, GUSTAV A. HAGEMANN, of Copenhagen, in Denmark, have invented a new and Improved Method of Preparing Acetate of Alumina for a Mordant, of which the following is a specification:

My invention relates to the mordant chemically known as acetate of alumina; and consists in a mode of preparing the ingredients out of which it is made and presenting them to the public in the best form and proportions to be used, as hereinafter described.

The acetate of alumina is prepared by mixing a solution of acetate of soda with a solution of sulphate of alumina in the proportion of two equivalents of acetate of soda and three equivalents of sulphate of alumina. Useful mordants may, however, be prepared by using the ingredients in different proportions from those given above. If desired, both ingredients may be dissolved in the same portion of water.

The above-mentioned ingredients may be mixed with each other in the above-mentioned proportions in a pulverized state; which mixture, when dissolved in water, results in the production of acetate of alumina, and furnishes a mordant of superior quality.

The best and most stable product is prepared as follows: The acetate of soda is calcined to an anhydrous or a monohydrous state, and then pulverized by means of a fine sieve. The finest powder is removed and mixed with a fresh charge of hydrous acetate to be calcined. The coarser powder of average fineness is separated by another sieve, (one-quarter holes,) and forms the part prepared for use. The sulphate of alumina is ground and then sifted in a similar manner. The two coarse-grained powders thus obtained are then mixed with each other, preferably, by sifting both at the same time through an open sieve, in the proportions above mentioned, and the mixed powder is ready for packing.

It should be observed that when the mixed powder is dissolved for use, the solution should remain for twenty-four hours before being used, during which time it should be frequently stirred and agitated.

It is preferable to make a strong solution, which should be diluted before being used.

It should be observed that the sulphate of alumina may be used in the form of crystal alum, concentrated alum, aluminous cake, &c.

Having thus described my invention, I claim as new, and desire to secure by Letters Patent—

As an article of manufacture a package of coarse powder of calcined and pulverized acetate of soda and sulphate of alumina, ready to be dissolved for the production of the mordant acetate of alumina, as described.

GUSTAV ADOLPH HAGEMANN.

Witnesses:
I. SCHOW,
M. CLAUSEN.